June 25, 1968  M. L. EDWARDS  3,389,888
WAVE-POWERED EQUIPMENT

Filed Jan. 6, 1966  2 Sheets-Sheet 1

United States Patent Office 3,389,888
Patented June 25, 1968

3,389,888
WAVE-POWERED EQUIPMENT
Morgan L. Edwards, 1127 Grand Ave.,
Dayton, Ohio 45407
Filed Jan. 6, 1966, Ser. No. 519,144
17 Claims. (Cl. 253—4)

ABSTRACT OF THE DISCLOSURE

A container with flexible walls is mounted adjacent the surface of a body of water so it is at the approximate level of the troughs of waves on that body of water, a conduit extends into that body of water and is connected to the interior of that container by a valve, a second conduit is connected to the interior of that container by a second valve, that container will respond to the forces applied to it by waves to become compressed and thereby force water out through the second valve and the second conduit, and a spring will restore that container to its extended position to permit further water to enter that container through the first conduit and the first valve.

---

Figure 1:
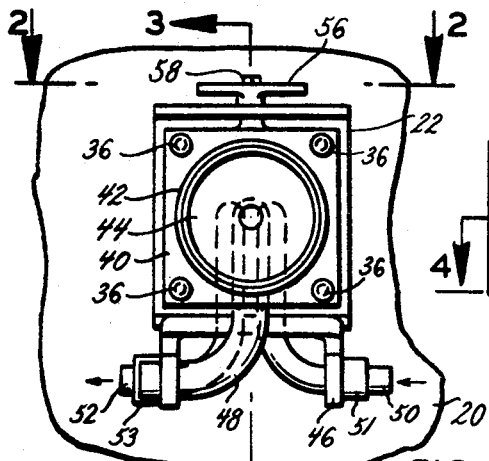

This invention relates to improvements in wave-powered equipment. More particularly, this invention relates to improvements in equipment which can effectively utilize the energy in waves.

It is, therefore, an object of the present invention to provide an improved device which can effectively utilize the energy in waves.

As pointed out in Willard Bascom's book, "Waves and Beaches," winds that move across the surface of a body of water generate "wind waves" at the top of that body of water; and, as those wind waves move out from under the winds that generate them, they become "swell." Waves, in the form of swell, can travel for thousands of miles across deep water with little loss of energy. Further, as pointed out in that book, the energy in a wave can be quite large; and, in recognition of that fact, a number of devices have been proposed for utilizing the energy in waves. Some of those devices utilized pistons and cylinders, and hence those devices had excessive frictional losses. Other of those devices were not set at the proper levels relative to the waves that reached them, and still other of those devices utilized only small portions of the available energy in the waves that reached them. As a result, prior wave-powered devices have been objectionable. The present invention obviates these objections by providing a wave-operated device which has minimal frictional losses, which can be set at the level of the anticipated troughs of the waves that will reach it, and which can effectively utilize energy in the portions of the waves between the troughs and crests of those waves. It is, therefore, an object of the present invention to provide a wave-powered device which has minimal frictional losses, which can be set at the level of the anticipated troughs of the waves that will reach it, and which can effectively utilize energy in the portions of the waves between the troughs and crests of those waves.

Other and further objects and advantages of the present invention should become apparent from an examination of the drawing and accompanying description.

In the drawing and accompanying description several preferred embodiments of the present invention have been shown and described but it is to be understood that the drawing and accompanying description are for the purpose of illustration only and do not limit the invention and that the invention will be defined by the appended claims.

Figure 3:
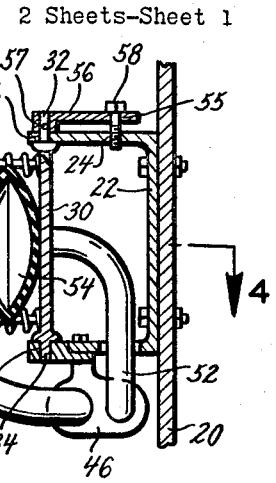
Figure 2:
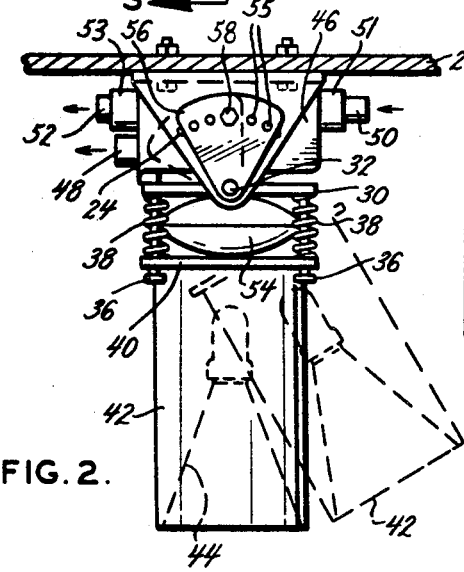
Figure 4:
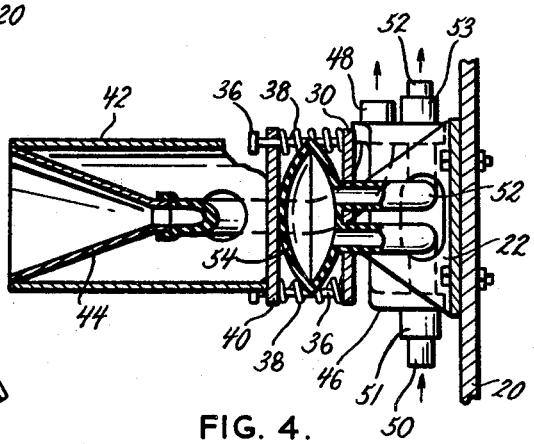
Figure 5:
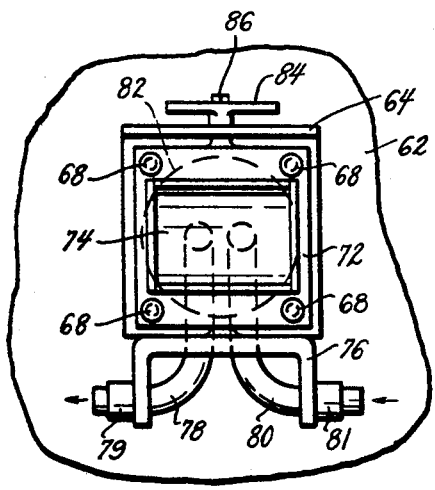
Figure 6:
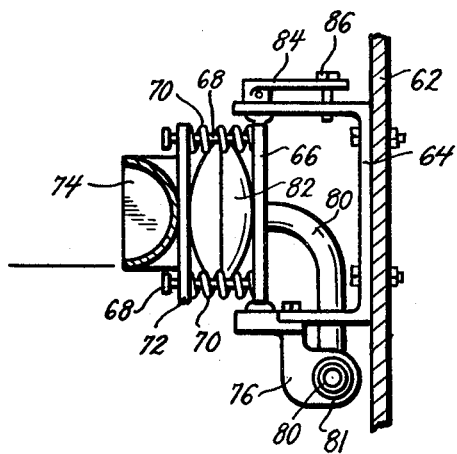
Figure 8:
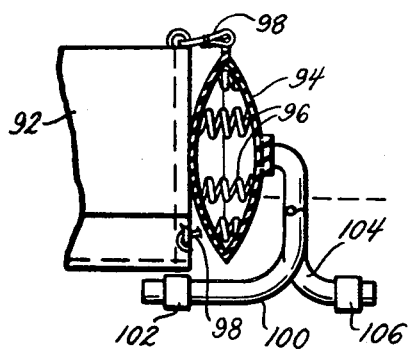
Figure 7:
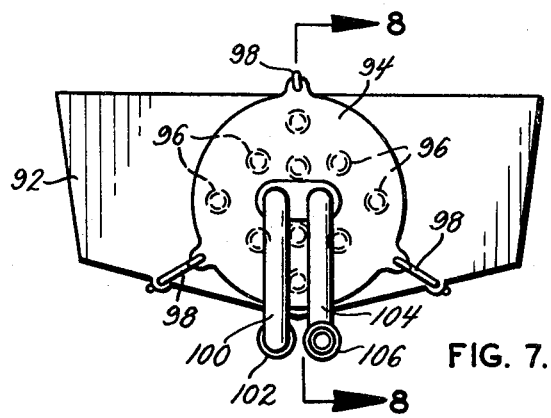
Figure 9:
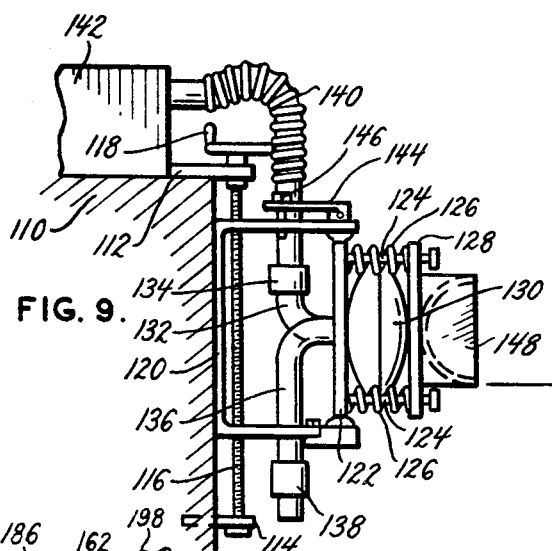
Figure 10:
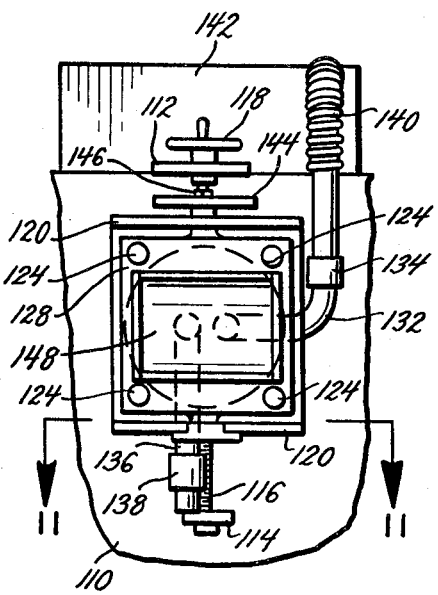
Figure 12:
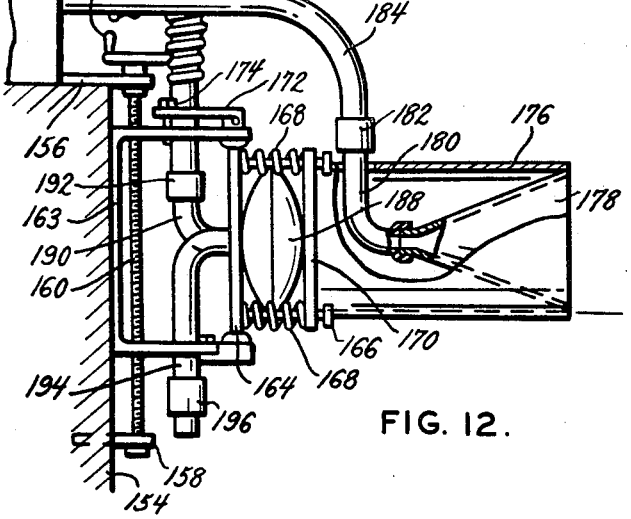
Figure 11:
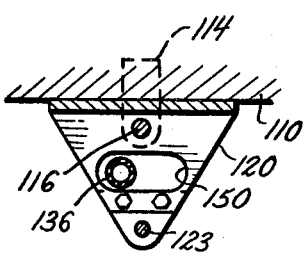

In the drawing:

FIG. 1 is a front elevational view of one preferred embodiment of wave-operated device that is made in accordance with the principles and teachings of the present invention, FIG. 2 is a plan view of the wave-operated device shown in FIG. 1, it is taken along the plane indicated by the line 2—2 in FIG. 1, and it shows one moved position of that device by dotted lines, FIG. 3 is a sectional view through the wave-operated device of FIG. 1, and it is taken along the plane indicated by the line 3—3 in FIG. 1, FIG. 4 is another sectional view through the wave-operated device of FIG. 1, and it is taken along the plane indicated by the line 4—4 in FIG. 3, FIG. 5 is a front elevational view of another preferred embodiment of wave-operated device that is made in accordance with the principles and teachings of the present invention, FIG. 6 is a vertical section through the wave-operated device of FIG. 5, FIG. 7 is a rear elevational view of another preferred embodiment of wave-operated device that is made in accordance with the principles and teachings of the present invention, FIG. 8 is a sectional view through the wave-operated device of FIG. 7, and it is taken along the plane indicated by the line 8—8 in FIG. 7, FIG. 9 is a side elevational view of a still further preferred embodiment of wave-operated device that is made in accordance with the principles and teachings of the present invention, FIG. 10 is an end elevational view of the wave-operated device shown in FIG. 9, FIG. 11 is a sectional view through the wave-operated device of FIG. 9, and it is taken along the plane indicated by the line 11—11 in FIG. 10, and FIG. 12 is a partially broken-away, side elevational view of yet another preferred embodiment of wave-operated device that is made in accordance with the principles and teachings of the present invention.

Referring to the drawing in detail, the numeral 20 denotes part of the hull of a ship or boat. The showing of that hull is merely representative; and it is intended to represent any size or shape of hull of any suitable ship or boat. A C-shaped bracket 22 is suitably secured to the exterior of that hull, as by bolts; and the upper and lower arms of that bracket are generally triangular, as shown particularly by FIGS. 2 and 4. A number of vertically-directed threaded openings 24 are formed in the upper arm of the bracket 22, as shown by FIG. 2; and those openings are arranged to define an arc. An opening 26 is provided in the upper arm of the bracket 22, and that opening is located at the axis of generation of the arc defined by the openings 24. An opening 28 is provided in the lower arm of the bracket 22, and that opening is co-axial with the opening 26.

The numeral 30 denotes a plate which has a pivot 32 projecting upwardly from the upper edge thereof, and which has a pivot 34 projecting downwardly from the lower edge thereof. The pivot 32 extends upwardly through the opening 26 in the upper arm of the C-shaped bracket 22, and the pivot 34 extends downwardly through the opening 28 in the lower arm of that bracket. That lower arm is made in two separable pieces to enable the pivots 32 and 34 to be disposed within the openings 26 and 28 of that C-shaped bracket. Four guide posts 36 are secured to the front face of the plate 30; and, in the preferred embodiment of wave-operated device shown by FIGS. 1–4, the guide posts 36 have threaded inner ends which extend into threaded openings in the plate 30 and have enlarged heads at the outer ends thereof. The numeral 40 denotes a reciprocable plate with four openings therein which are in register with the four guide posts 36 carried by the plate 30.

The numeral 38 denotes four helical compression springs which are telescoped over the shanks of the guide posts 36.

The reciprocable plate 40 will be telescoped over the shanks of the guide posts 36, and then the helical compression springs 38 will be telescoped over those shanks before the threaded inner ends of those guide posts will be set within the threaded sockets in the plate 30. The diameters of the openings in the reciprocable plate 40 are smaller than the diameters of the heads of the guide posts 36, and hence those guide posts prevent accidental separation of that plate from those guide posts and from the plate 30. The helical compression springs urge the reciprocable plate 40 toward the heads of the guide posts 36, but they can yield to permit that plate to move toward the plate 30.

A tubular support 42 is secured to the outer face of the plate 40, as shown particularly by FIG. 3; and the axis of that support is perpendicular to that plate. A funnel 44 is mounted within the outer end of the tubular support 42; and the largest diameter of that funnel is adjacent that outer end, and the smallest diameter of that funnel is disposed inwardly of that outer end. A U-shaped bracket 46 is secured, in inverted position, to the lower arm of the C-shaped bracket 22. In the said preferred embodiment of wave-operated device shown by FIGS. 1–4, the former bracket is made integral with the separable part of that lower arm which has the opening 28 therein. The bracket 46 has one opening in the right-hand arm thereof, as that bracket is viewed in FIG. 1, and it has two openings in the left-hand arm thereof. A flexible conduit 48 has one end thereof secured to the inner end of the funnel 44 and has the other end thereof extending through the outermost of the two openings in the left-hand arm of the bracket 46. That end of that conduit will be mounted so it is directed rearwardly of the ship or boat.

The numeral 50 denotes a flexible conduit which has one end thereof disposed within the opening in the right-hand arm of bracket 46 in FIG. 1; and that conduit has the upper end thereof connected to, and in communication with the interior of a flexible container 54. The lower end of the flexible conduit 50 has a check valve 51 therein; and that check valve permits water to pass through it from right to left in FIG. 1 but substantially precludes movement of water through it from left to right. The lower end of the flexible conduit 50 will be directed forwardly of the ship or boat. The numeral 52 denotes a flexible conduit which has the lower end thereof disposed within the inner opening in the left-hand arm of the bracket 46; and the upper end of that conduit extends to, and is in communication with the interior of, the flexible container 54. A check valve 53 is provided in the lower end of the flexible conduit 52, and that check valve permits water to pass through it from right to left in FIG. 1 but will substantially preclude movement of water through it from left to right.

The right-hand side of the flexible container 54, as that flexible container is viewed in FIGS. 3 and 4, is suitably secured to the outer face of the plate 30. The left-hand face of the flexible container 54, as that flexible container is viewed in FIGS. 3 and 4, is suitably connected to the inner face of the reciprocable plate 40. The helical compression springs 38 bias the plate 40 away from the plate 30, and thus tend to extend the flexible container 54. However, those springs can yield and permit the plate 40 to move toward the plate 30, and thus effect compression of that flexible container.

The numeral 56 denotes a bracket which is fixedly secured to the pivot 32 by a pin 57 that extends through the hub of that bracket. That bracket has a number of vertically-directed openings therein, and those openings are arranged to define an arc. That arc has the pivot 32 as the axis of generation thereof. A machine screw 58 can extend downwardly through any of the openings 55 in the bracket 56 and can extend into any of the threaded openings 24; and that screw can fixedly hold that bracket in any one of a number of desired positions. Because the bracket 56 is fixedly secured to the hinge 32, the setting of that bracket in different positions can effect setting of the plate 34, and hence of the funnel 44, in any of a number of desired positions. The flexible natures of the conduits 48, 50 and 52 permit the plate 30 to be moved into different positions that are angularly displaced from the bracket 22.

In using the apparatus of FIGS. 1–4, the lower ends of the conduits 48 and 52 are directed aft of the ship or boat, and the lower end of the conduit 50 is directed forwardly of that ship or boat. The screw 58 is loosened, and then the plate 30 is rotated to direct the funnel 44 toward the wind-driven or swell waves that are moving toward the ship or boat; and then that screw is set in the appropriate openings 55 and 24 to hold that funnel in that position. Where desired, a gear and a gear segment or a servo mechanism could be used to move the plate 30; and a suitable remotely-operated latching mechanism could be substituted for the screw 58 and the openings 55 and 24.

The bracket 22 will be mounted on the exterior of the hull of the boat or the ship so the lower edge of the funnel 44 will be close to the anticipated level of the troughs of the wind waves or swell approaching the ship or boat. As the ship or boat is moved along under the propulsive forces of its engines or sails, water will be forced to enter the lower end of the flexible conduit 50, to pass through the check valve 51, to rise upwardly through the flexible conduit 50 and to enter and fill the flexible container 54. Some of that water may then move outwardly from that flexible container through the flexible conduit 52 and the check valve 53 and be discharged in the aft direction; but any such water will be replaced by further water entering the flexible conduit 50, and hence the flexible container 54 will remain filled with water. When wind waves or swell engage the funnel 44, the portions of those waves or swell which are intermediate the troughs and crests of those waves or swell will enter the funnel 44 and will apply horizontally-directed forces to that funnel. Portions of those waves or swell will pass through the funnel 44 and through the flexible conduit 48 and then be discharged from the lower end of that flexible conduit. Those portions of those waves or swell will be discharged in the aft direction, and will thus provide a thrust which will tend to force the ship or boat to move in the forward direction. Other portions of those waves or swell will not be able to pass through the funnel 44 and, instead, will apply forces to that funnel which will force the plate 40 toward the plate 30—despite the forces applied by the helical compression springs 38. As the plate 40 is forced toward the plate 30, the flexible container 54 will be compressed; and the compression of that flexible container will force water to pass outwardly from that container. Substantially no water will be able to pass outwardly from that container through the flexible conduit 50, because the check valve 51 will substantially prevent any movement of water through it from left to right, as that check valve is viewed in FIG. 1. However, the check valve 53 will readily permit water to flow through it from right to left, as that check valve is viewed in FIG. 1; and hence the water in the flexible container 54 will readily move outwardly through the flexible conduit 52 and be discharged in the aft direction. That water will provide a further thrust which will tend to force the ship or boat to move in the forward direction.

After the force of each wind wave or swell has been dissipated, the helical compression springs 38 will move the plate 40 and the funnel 44 back to the positions shown by FIGS. 2–4; and, as they do so, they will cause the flexible container 54 to be distended. As that flexible container becomes distended, water will pass through the check valve 51 and then upwardly through the flexible conduit 50 into that flexible container.

Each successive wind wave or swell will cause a dual thrust to be developed; and that dual thrust will help propel the ship or boat forwardly. Specifically, part of each wind wave or swell will pass inwardly through the funnel 44 and then through the conduit 48 to provide one thrust, and another part of that wind wave or swell will compress the flexible container 54 and thus cause water held within that container to pass through the flexible conduit 52 and the check valve 53 to provide a second thrust in the aft direction. Those thrusts can be quite sizable, where the funnel 44, the flexible container 54, the flexible conduits 48, 50 and 52, and the check valves 51 and 53 have large capacities.

Referring to FIGS. 5 and 6, the numeral 62 denotes the hull of a ship or boat; and a C-shaped bracket 64 is suitably secured to that hull. A plate 66 has pivots at the top and bottom thereof, and those pivots extend into openings, not shown, in the upper and lower arms of the C-shaped bracket 64. The lower arm of that bracket is made in separable portions to facilitate the securement of the pivots for the plate 66 to those arms. Four guide posts 68 are secured to the outer face of the plate 66, and a reciprocable plate 72 is mounted on and guided by those guide posts. Helical compression springs 70 surround the guide posts 68 and urge the plate 72 away from the plate 66. A concave member 74, which has planar sides, is secured to the outer face of the reciprocable plate 72, as shown particularly by FIG. 6. A U-shaped bracket 76 is secured, in inverted fashion, to the lower arm of the bracket 64; and the former bracket has an opening in each arm thereof. A flexible conduit 78 has the lower end thereof held within the opening in the left-hand arm of the bracket 76, as that bracket is viewed in FIG. 5; and a check valve 79 is provided in that lower end of that flexible conduit. The lower end of a flexible conduit 80 is disposed within the opening in the right-hand arm of the bracket 76, as that bracket is viewed in FIG. 5, and a check valve 81 is provided in that lower end. The upper ends of the flexible conduits 78 and 80 extend to, and are in communication with the interior of, a flexible container 82. The right-hand face of that flexible container, as that flexible container is viewed in FIG. 6, is secured to the plate 66; and the lefthand face of that flexible container, as that flexible container is viewed in FIG. 6, is secured to the inner face of the reciprocable plate 72. A triangular bracket 84 is secured to the upper pivot of the plate 66, by a pin; and a screw 86 can extend through openings in that bracket to seat in threaded openings in the upper arm of the C-shaped bracket 64 to hold the plate 66 at any desired angle relative to the hull 62.

The bracket 64, the rotatable plate 66, the guide posts 68, the helical compression springs 70, the reciprocable plate 72, the flexible conduits 78 and 80, the check valves 79 and 81, the bracket 84, and the screw 86 can be identical to the bracket 22, the plate 30, the guide posts 36, the helical compression springs 38, the reciprocable plate 40, the flexible container 54, the flexible conduits 52 and 50, the check valves 53 and 51, the bracket 56, and the screw 58 of FIGS. 1–4. The bracket 76 differs from the bracket 46 of FIGS. 1–4 in that it has just two openings therein. The plate 72 has the concave member 74 secured thereto rather than having a tubular support, such as the tubular support 42 of FIGS. 1–4, secured to it.

In using the wave-operated device of FIGS. 5 and 6, the screw 86 will be raised to permit the plate 66 to be rotated relative to the hull 62. Once that plate has been set so the plate 72 is perpendicular to the direction of movement of wind waves or swell approaching toward the ship or boat, the screw 86 will be set in position to hold that plate fixed relative to the hull 62. The bracket 64 will have been secured to the hull of the ship so the lower edge of the concave member 74 will be close to the anticipated level of the troughs of wind waves and swell. As such waves or swell strike that concave member, that concave member will tend to convert the kinetic energy of those wind waves or swell to thrust; and that thrust will co-act with the forces which those wind waves or swell apply to any exposed portions of the reciprocable plate 72 to force that plate toward the plate 66. The consequent compression of the flexible container 82 will force water to move through the conduit 78 and the check valve 79 and provide a thrust in the aft direction. That thrust will urge the ship or boat to move in the forward direction. As the energy of the wind wave or swell dissipates, the helical compression springs 70 will move the reciprocable plate 72 back to the position shown by FIG. 6. As that reciprocable plate moves back to that position, it will distend the flexible container 82; and, thereupon, further water will move upwardly through the check valve 81 and the flexible conduit 80 to re-fill that flexible container.

In FIGS. 7 and 8, the numeral 92 denotes a small boat; and a flexible container 94 is secured to the rear of that boat by fasteners 98. Those fasteners can be lengths of chain, can be lengths of rope, or the like. A number of helical compression springs 96 are disposed within the flexible container 94; and those springs will normally distend that flexible container to the position indicated by FIG. 8. However, those springs will respond to wind waves or swell that approach the rear of the boat 92 to yield and thereby permit that flexible container to be compressed.

A conduit 100 extends downwardly and then forwardly from the container 94, and that conduit communicates with the interior of that flexible container. A check valve 102 readily permits water to pass through it from left to right, as that check valve is viewed in FIG. 8; but it will substantially preclude any flow of water through it from right to left. A conduit 104 also is secured to the flexible container 94, and that conduit is in communication with the interior of that flexible container. A check valve 106 is provided at the lower end of that flexible conduit, and that check valve will permit water to flow readily through it from left to right, as that check valve is viewed in FIG. 8; but it will substantially preclude any movement of water through it from right to left. The conduit 100 is directed forwardly of the boat 92, and the conduit 104 is directed aft of that boat.

As the boat 92 is moved forwardly under the propulsive effect of a sail or oars, water will flow through the check valve 102 and the conduit 100 to fill the flexible container 94. Some of that water may flow outwardly through the conduit 104 and the check valve 106, but further water will then flow into the flexible container 94. As a result, that flexible container will be filled with water.

When wind waves or swell strike the rear surface of the flexible container 94, that flexible container will become compressed. Although the helical compression springs 96 will tend to hold that flexible container in distended position, those springs will yield to permit that flexible container to compress. As that flexible container becomes compressed, water will be forced out of that flexible container; and the check valve 102 will effectively keep that water from passing through the flexible conduit 100, and will thus force that water to pass through the flexible conduit 104 and the check valve 106. That water will be directed aft of the boat 92, and will thus provide a thrust which will urge that boat to move in the forward direction. As the wind wave or swell expends its energy, the springs 96 within the flexible container 94 will again distend that flexible container; and, as that container becomes distended, further water will pass through the check valve 102 and the conduit 100 to re-fill that flexible container.

Referring to FIGS. 9–11, the numeral 110 denotes a stationary support which will be disposed within, or adjacent to, a large body of water. That support can be part of a dock, part of a sea wall, part of a barrier, or the like. A plate 112 is suitably secured to the upper surface of the support 110, and a second plate 114 has the inner end thereof suitably embedded within that support. Bearings are mounted adjacent the outer ends of the plates 112 and 114, and those bearings rotatably support an elongated, threaded rod 116. A hand wheel 118 is secured to the upper end of that rod, and that hand wheel can be rotated to rotate that rod.

A C-shaped bracket 120 has threaded openings in the upper and lower arms thereof, and those threaded openings accommodate the threaded rod 116. The closed portion of the C-shaped bracket can abut and be guided by the outer face of the support 110, or it could abut a suitable track or guide which was secured to that inter face. As a result, rotation of the rod 116 will not cause rotation of the C-shaped bracket 120 but, instead, will cause that bracket to move upwardly or downwardly relative to the support 110. A plate 122, with pivots at the upper and lower edges thereof, has those pivots extending into openings in the outer ends of the arms of the bracket 120. The lower arm of that bracket is made in separable portions to facilitate the assembling of the plate 122 with the arms of that bracket. The lower pivot of the plate 122 is denoted by the numeral 123 and is shown in FIG. 11.

Four guide posts 124 are secured to the plate 122; and a reciprocable plate 128 is supported and guided by those guide posts. Helical compression springs 126 surround the guide posts 124 and urge the plate 128 to the right in FIG. 9; but those springs can yield to permit that plate to move to the left. A flexible container 130 has the right-hand face thereof, as that flexible container is viewed in FIG. 9, connected to the plate 128; and that flexible container has the left-hand face thereof, as that flexible container is viewed in FIG. 9, secured to the plate 122. The helical compression springs 128 will normally distend the flexible container 138, but those springs can yield to permit that flexible container to be compressed.

A conduit 132 is secured to, and communicates with the interior of, the flexible container 130; and that conduit extends upwardly to a check valve 134 which will permit water to move upwardly through it but will substantially keep water from flowing downwardly through it. A conduit 136 also is connected to, and is in communication with the interior of, the flexible container 130; and that conduit has a check valve 138 in the lower end thereof. That check valve permits water to pass upwardly through it but substantially precludes the movement of water downwardly through it. The lower end of the conduit 136 will be disposed below the level of the water adjacent the support 110. A flexible conduit 140 extends upwardly from the outlet port of the check valve 134 to a reservoir 142. That reservoir has, for convenience, been shown as being only a short distance above the level of the flexible container 130; but that reservoir will preferably be between twenty-five and one hundred feet above the level of the flexible container 130. Further, the flexible container 142 will be quite large so it can hold a substantial amount of water.

A triangular bracket 144 is secured to the upper pivot on the plate 122 by a pin; and a screw 146 can extend down through one of a number of openings in that triangular bracket to seat in one of a number of openings in the upper arm of the C-shaped bracket 120. That screw can be raised upwardly out of the threaded opening in the upper arm of the C-shaped bracket 120 to permit rotation of the plate 122 relative to that C-shaped bracket. A slot 150 is provided in the lower arm of the C-shaped bracket 120 to accommodate the conduit 136; and that slot is large enough to permit the conduit 136 to move freely with the rotatable plate 122. A concave member 148 with planar ends is secured to the outer face of the reciprocable plate 128; and the lower edge of that concave member will be set at the approximate level of the troughs of the wind waves and swell of the said body of water. The wave-operated device of FIGS. 9-11 is similar in configuration to the wave-operated device of FIGS. 5 and 6. However, the wave-operated device of FIGS. 9-11 differs from the wave-operated device of FIGS. 5-6 in that the former is mounted on a stationary support whereas the latter is mounted on a boat, and in that the former is intended to raise water to a level above the level of the flexible container of that device whereas the latter is intended to provide propulsive thrusts to cause the boat or ship to move forward. Also, the wave-operated device of FIGS. 9-11 has the elongated threaded rod 116 to permit the vertical position of the concave member 148 with planar ends to be adjusted. Such an adjustment is desirable where the level of the water in the large body of water changes from time to time. Where desired, a corresponding mechanism for adjusting the vertical position of the C-shaped bracket 64 in FIGS. 5 and 6 could be provided. Such an adjusting mechanism would compensate for differences in the loading of the ship or boat on which the wave-operated device of FIGS. 5 and 6 was mounted. Also, where desired, the hand wheel 118 could be eliminated, and a suitable servo mechanism could be used to rotate the elongated rod 116. Also, the screw 146 could be eliminated, and a suitable servo mechanism could be used to rotate the rotatable plate 122 and then lock that rotatable plate in position against accidental rotation.

In using the wave-operated device of FIGS. 9-11, the rotatable plate 122 will be rotated to dispose the reciprocable plate 128 so it is perpendicular to the direction in which the wind waves or swell approach the support 110. Further, the bracket 120 will be set so the lower edge of the concave member 148 is at the approximate level of the troughs of the wind waves or swell which approach that support. Where that is done, each wave that strikes the concave member 148 and the exposed portions of the reciprocable plate 128 will force that plate to the left in FIG. 9, with consequent compression of the flexible container 130. As that flexible container is compressed, it will force water to flow out of it; and, because the check valve 138 keeps water from moving downwardly through it, the water passing outwardly from the flexible container 130 will have to move upwardly through the check valve 134 and then upwardly through the flexible conduit 140 into the reservoir 142. As the wind waves and swell expend their energy, the helical compression springs 126 will move the reciprocable plate 128 back to the position shown by FIG. 9; and such movement will cause the flexible container 130 to return to the distended position shown by FIG. 9. As that flexible container returns to that position, water will rise upwardly through the check valve 138 and the conduit 136 to re-fill the flexible container 130.

Each succeeding wind wave or swell that strikes the concave member 148 will force additional water upwardly through the conduit 132, the check valve 134, and the flexible conduit 140 into the reservoir 142. The water in the reservoir 142 will have a substantial potential energy; and it can be used as a source of drinking water, water for household and industrial purposes, irrigation water, and water for power generation purposes where the support 110 is disposed within or adjacent to a body of fresh water, and it can be used for power generation purposes where the support 110 is mounted within or adjacent to a body of salt water.

In FIG. 12, the numeral 154 denotes a support which can be disposed within or adjacent to a large body of water; and a plate 156 is secured to the top of that support while a plate 158 has the inner end thereof embedded within that support. Bearings are carried by the outer ends of the plates 156 and 158; and those bearings rotatably support an elongated threaded rod 160. A hand wheel 162 is secured to the upper end of that rod to facilitate rotation of that threaded rod. A C-shaped bracket 163 has threaded openings in the upper and lower arms thereof to accommodate the threaded rod 160; and the closed side of that bracket will abut the support 154, or a guide secured to that support, to prevent rotation of that bracket relative to that support. A plate 164 with pivots on the upper and lower edges thereof is rotatably held by the arms of the bracket 163; and the lower arm of that bracket is made in separable sections to facilitate the assembling of the plate 164 with that bracket. Guide posts 166 are secured to the rotatable plate 164, and a reciprocable plate 170 is supported and guided by those guide posts. Helical compression springs 168 urge the plate 170 to the right in FIG. 12, but those springs can yield to permit that plate to move to the right. A triangular bracket 172 is fixedly secured to the upper pivot of the plate 164 by a pin; and a screw 174 can be set within one of a number of openings in that bracket and can seat in threaded openings in the upper arm of the bracket 163. A tubular support 176 is secured to the outer face of the plate 170; and a funnel 178 is disposed within the outer end of that support. A flexible conduit 180 extends to a check valve 182 that permits water to pass upwardly through it but that substantially precludes the movement of water downwardly through it. A flexible conduit 184 extends upwardly from the check valve 182 to a reservoir 186. That reservoir has, for convenience, been shown only a short distance above the level of the funnel 178; but, preferably, that reservoir will be disposed between about twenty-five feet and one hundred feet above the level of that funnel.

A flexible container 188 has the right-hand face thereof, as that flexible container is viewed in FIG. 12, secured to the inner face of the reciprocable plate 170, and has the left-hand face thereof secured to the rotatable plate 164. The springs 168 will tend to distend that flexible container, but those springs can yield to permit that flexible container to be compressed. A conduit 190 is connected to, and is in communication with the interior of, the flexible container 188; and the upper end of that conduit extends to a check valve 192 which permits water to move upwardly through it but which substantially precludes any movement of water downwardly through it. A flexible conduit 198 extends upwardly from the outlet port of the check valve 192 to the reservoir 186. A conduit 194 is connected to, and is in communication with the interior of, the flexible container 188; and that conduit has a check valve 196 adjacent the lower end thereof which permits water to move upwardly through it but which substantially precludes the movement of water downwardly through it.

The wave-operated device of FIG. 12 is similar to the wave-operated device of FIGS. 1–4, but it differs from that wave-operated device in that the former is intended to raise water upwardly to the reservoir 186 whereas the latter is intended to provide propulsive thrust to move a ship or boat in the forward direction. Further, the former has a vertical-adjusting mechanism, whereas the latter does not. However, the latter could easily be equipped with such an adjusting mechanism to enable the lower edge of the funnel 44 thereof to be set at the approximate level of the troughs of wind waves and swell approaching the ship or boat, irrespective of the loading or amount of ballast for that ship or boat.

In using the wave-operated device of FIG. 12, the plate 170 will be directed toward the wind waves or swell approaching the support 154; and the funnel 178 will be set so the lower edge thereof is at the approximate level of the troughs of those wind waves or swell. Each wind wave or swell will then cause part thereof to pass upwardly through the conduit 180 and the check valve 182 into the conduit 184, and another part of that wind wave or swell will force the plate 170 to move to the left in FIG. 12 to compress the flexible container 188. The consequent forcing of water out of that flexible container, through the conduit 190 and the check valve 192 into the flexible conduit 198; will force water to move upwardly in that flexible conduit. After each wind wave or swell has expended its energy, the springs 168 will move the plate 170 back to the position shown by FIG. 12 and will again distend the flexible container 188. As that flexible container is distended, water will pass upwardly through check valve 196 and the conduit 194 to refill that flexible container. In this way, the wind waves or swell will progressively force water upwardly into the reservoir 186 where it will have a substantial amount of potential energy.

The sizes of the flexible containers provided by the present invention are limited only by the mechanical strengths of the materials of which those containers are made; and those materials can be strong enough to enable those containers to be many feet in diameter. Such containers can respond to wind waves or swell to develop very substantial forces on the water which is either thrust aft to provide propulsive forces or is directed upwardly to a reservoir to have potential energy developed in it.

It should be noted that the wave-operated devices of FIGS. 1–8 can be used to start a boat or ship moving as well as to aid the propulsion of a moving boat or ship. Thus, if a sailing vessel were to be becalmed, or if the engines of a ship or boat were to break down, the wind waves or swell could act upon those devices to develop the thrust that was needed to get the vessel, ship or boat under way. Specifically, the wind waves or swell would cause portions thereof to enter and pass through the funnel 44 and conduit 48 of FIGS. 1–4; and those portions would provide propulsive thrusts that could get the vessel, ship or boat under way. Also, the wind waves or swell would recurrently compress the flexible containers 54, 82 and 94 of FIGS. 1–8; and those containers would recurrently draw water up into them and then expel that water in the aft direction. That water also would provide propulsive thrusts that could get the vessel, ship or boat under way.

FIGS. 1–4, and 12 disclose wave-operated devices that utilize funnels plus flexible containers; and FIGS. 5–8 and 9–11 disclose wave-operated devices that utilize flexible containers. If desired, the flexible containers 54 and 188 of FIGS. 1–4 and 12 could be dispensed with; and the funnels 44 and 178 could be mounted directly upon the rotatable plates 30 and 164, respectively, of FIGS. 1–4 and 12.

The helical compression springs 38 in FIGS. 1–4 and the helical compression springs 168 in FIG. 12 perform a dual function. Not only do they bias the flexible containers 54 and 188 to their extended conditions, but they also absorb some of the shocks which waves can apply to the funnels 44 and 178. As a result, the wave-operated devices of FIGS. 1–4 and 12 are enabled to withstand the heavy pounding that some waves can apply to them.

Whereas the drawing and accompanying description have shown and described several preferred embodiments of the present invention it should be apparent to those skilled in the art that various changes may be made in the form of the invention without affecting the scope thereof.

What I claim is:

1. A wave-operated device that comprises:
  (a) a support that can be mounted adjacent a body of water on which waves customarily form,
  (b) a container that has readily-flexible walls and is mounted on said support,
  (c) a conduit having one end thereof disposed in said body of water and having the other end thereof extending to, and communicating with the interior of, said flexible container,
  (d) a second conduit having one of the ends thereof extending to, and communicating with the interior of, said flexible container,
  (e) means biasing said flexible container to extended condition,
  (f) said biasing means and said flexible container being yieldable to permit waves, on said body of water that approach said flexible container, to compress said flexible container,
  (g) said flexible container normally being in extended condition and normally having water therein, but responding to waves on said body of water to become compressed and thereby expel water through said second conduit, (h) said flexible container thereafter responding to said biasing means to return to its extended condition, (i) the first said conduit permitting water to move through it, from said body of water into said flexible container, as said baising means returns sad flexible container to its extended condition, (j) means to prevent any appreciable flow of water through the first said conduit from said flexible container to said body of water, and (k) further means to prevent any appreciable flow of water through said second conduit to said flexible container.

2. A wave-operated device as claimed in claim 1 wherein said support holds the lower edge of said flexible container at the approximate level of the troughs of said waves on said body of water.

3. A wave-operated device as claimed in claim 1 wherein said support includes means for adjusting the vertical position of the lower edge of said flexible container, whereby said lower edge of said flexible container can be set at the approximate level of the troughs of said waves on said body of water despite changes in said level.

4. A wave-operated device as claimed in claim 1 wherein said flexible container has a surface that is intended to be directed toward said waves, and wherein said support includes means for permitting said flexible container to be moved into different positions angularly of a vertical axis to enable said waves on said body of water to move substantially directly toward said surface of said flexible container.

5. A wave-operated device as claimed in claim 1 wherein said flexible container is a bag which has flexible yieldable walls and wherein said biasing means are helical compression springs.

6. A wave-operated device as claimed in claim 1 wherein said support includes a plate that can be rotated about a vertical axis, said flexible container being secured to and being rotatable with said plate, and a concave member that is disposed outwardly of, and that is secured to and is movable with, a portion of said flexible container, said concave member tending to convert the kinetic energy of said waves to thrust that will compress said flexible container.

7. A wave-operated device as claimed in claim 1 wherein said support includes a plate to which part of said flexible container is secured, guide posts carried by said plate, and a second plate that is guided and supported by said guide posts, said flexible container having a second part thereof secured to said second plate, said flexible container being disposed between said plates, said biasing means being springs that urge said plates apart to urge said flexible container to extended condition.

8. A wave-operated device as claimed in claim 1 wherein said means to prevent any appreciable flow of water through the first said conduit from said flexible container to said body of water is a check valve, and wherein said means to prevent any appreciable flow of water through said second conduit to said flexible container is a check valve.

9. A wave-operated device as claimed in claim 1 wherein said support moves with a ship or boat, wherein said one end of the first said conduit is directed forwardly of said ship or boat, and wherein the other end of said second conduit is disposed in said body of water and is directed aft of said ship or boat.

10. A wave-operated device as claimed in claim 1 wherein said other end of said second conduit extends to a reservoir which is located above the level of said flexible container.

11. A wave-operated device that comprises:
(a) a support that can be mounted adjacent a body of water on which waves customarily form,
(b) a funnel that is mounted on said support,
(c) said funnel having a large inlet opening and having a small outlet opening, (d) said support holding said funnel so said large inlet opening of said funnel can be engaged by waves on said body of water, (e) a liquid-tight conduit having one end thereof connected to said small outlet opening of said funnel, and (f) means to permit water to flow pass unidirectionally through said funnel and then through said liquid-tight conduit, (g) said funnel receiving waves on said body of water and causing portions of said waves to pass through said small outlet opening, past said means, and then through said liquid-tight conduit, (h) said support including means for adjusting the vertical position of the lower edge of said funnel whereby said lower edge of said funnel can be set at the approximate level of the troughs of said waves on said body of water despite changes in said level.

12. A wave-operated device as claimed in claim 11 wherein said support includes means for permitting said funnel to be moved into different positions angularly of a vertical axis to enable said waves on said body of water to move substantially directly toward said large inlet opening of said funnel.

13. A wave-operated device as claimed in claim 11 wherein said support moves with a ship or boat, and wherein the other end of said liquid-tight conduit is disposed in said body of water and is directed aft of said ship or boat.

14. A wave-operated device as claimed in claim 11 wherein said support includes resilient members that urge said large inlet opening of said funnel toward said waves but that can yield to absorb part of the shock which waves can apply to said funnel.

15. A wave-operated device as claimed in claim 11 wherein said other end of said water-tight conduit extends to a reservoir which is located above the level of said funnel.

16. A wave-operated device that comprises:
(a) a support that can be mounted adjacent a body of water on which waves customarily form,
(b) a container that has readily-flexible walls and is mounted on said support,
(c) a conduit having one end thereof disposed in said body of water and having the other end thereof extending to, and communicating with the interior of, said flexible container,
(d) a second conduit having one of the ends thereof extending to, and communicating with the interior of, said flexible container,
(e) means biasing a portion of said flexible container toward oncoming waves to extend said flexible container,
(f) a funnel that is movable with said portion of said flexible container and that is urged toward said oncoming waves by said biasing means,
(g) said biasing means and said flexible container being yieldable to permit waves, on said body of water that approach said flexible container, to compress said flexible container,
(h) said flexible container normally being in extended condition and normally having water therein, but responding to waves on said body of water to become compressed and thereby expel water through said second conduit,
(i) said flexible container thereafter responding to said biasing means to return to its extended condition,
(j) the first said conduit permitting water to move through it, from said body of water into said flexible container, as said biasing means returns said flexible container to its extended condition,
(k) means to prevent any appreciable flow of water through the first said conduit from said flexible container to said body of water,
(l) further means to prevent any appreciable flow of water through said second conduit to said flexible container, (m) said funnel having a large inlet opening and having a small outlet opening, (n) a liquid-tight conduit having one end thereof connected to said small outlet opening of said funnel, and (o) means to permit water to flow pass unidirectionally through said funnel and then through said liquid-tight conduit, (p) said funnel receiving waves on said body of water and causing portions of said waves to pass through said small outlet opening, past said means, and then through said liquid-tight conduit.

17. A wave-operated device as claimed in claim 16 wherein said support includes means to permit said flexible container and said funnel to be moved into different positions angularly of a vertical axis to enable said waves on said body of water to move substantially directly toward said flexible container and said large inlet opening of said funnel.

References Cited

UNITED STATES PATENTS

| 1,008,682 | 11/1911 | Wall | 103—65 |
| 1,024,816 | 4/1912 | Arnold | 253—4 |
| 1,073,214 | 9/1913 | Carr | 103—65 |

FOREIGN PATENTS

| 525,069 | 8/1940 | Great Britain. |
| 989,640 | 4/1965 | Great Britain. |

EVERETTE A. POWELL, JR., *Primary Examiner.*